United States Patent [19]

Koberstein et al.

[11] Patent Number: 5,013,705

[45] Date of Patent: May 7, 1991

[54] PLATINUM-FREE THREE-WAY CATALYST

[75] Inventors: Edgar Koberstein, Alzenau; Bernd Engler, Hanau; Rainer Domesle, Maintal; Herbert Voelker, Hanau, all of Fed. Rep. of Germany

[73] Assignee: Degussa Aktiengesellschaft, Frankfurt am Main, Fed. Rep. of Germany

[21] Appl. No.: 263,701

[22] Filed: Oct. 28, 1988

[30] Foreign Application Priority Data

Oct. 30, 1987 [DE] Fed. Rep. of Germany ....... 3736811

[51] Int. Cl.$^5$ .......................... B01J 21/04; B01J 23/10; B01J 23/44; B01J 23/46

[52] U.S. Cl. .................................... 502/262; 502/303; 502/304; 423/213.5

[58] Field of Search ...................... 502/304, 262, 303; 423/213.5

[56] References Cited

U.S. PATENT DOCUMENTS

| | | | |
|---|---|---|---|
| 4,171,287 | 10/1979 | Keith | 502/304 |
| 4,587,231 | 5/1986 | Sawamura et al. | 423/213.5 X |
| 4,678,770 | 7/1987 | Wan et al. | 502/304 |
| 4,680,282 | 7/1987 | Blanchard et al. | 502/304 |

*Primary Examiner*—W. J. Shine
*Attorney, Agent, or Firm*—Beveridge, DeGrandi & Weilacher

[57] ABSTRACT

The invention is a three-way catalyst of active aluminum oxide, palladium, rhodium and cerium dioxide. If $Al_2O_3$ is present as bulk carrier, the catalyst contains 5–20% by weight $CeO_2$ and if $Al_2O_3$ is present as a coating on a honeycombed, inert carrier, it contains 25–50% by weight $CeO_2$.

14 Claims, No Drawings

PLATINUM-FREE THREE-WAY CATALYST

The invention relates to a catalyst with an active phase applied to aluminum oxide of the transition series and consisting of 0.03–3% by weight palladium and rhodium with a weight ratio between palladium and rhodium of 1:1 to 20:1 and also includes a cerium dioxide content. The weight amounts of noble metal, cerium dioxide and aluminum oxide supplement each other 100%. The catalyst is obtained by impregnating an optionally lattice-stabilized carrier material with an aqueous solution of a salt of palladium and rhodium, drying and tempering at temperatures above 250° C., optionally in a gas current containing hydrogen.

As a result of the sharp rise in the price of platinum recently, the producers of catalysts for cleaning the exhaust gases of internal combustion engines perceived the need of developing rhodium-containing catalytic compositions which permit, without using platinum, an equivalent conversion of the pollutants CO, hydrocarbons and nitrogen oxides contained in the exhaust gases of internal combustion machines.

It was found that a complete exchange of the platinum in rhodium-containing formulations can be performed if the platinum is replaced with retention of the noble metal amounts customary thereby by palladium in conjunction with a high amount of cerium dioxide.

The subject matter of the invention is accordingly a catalyst with an active phase applied to aluminum oxide of the transition series and consisting of 0.03–3% by weight palladium and rhodium with a weight ratio between palladium and rhodium of 1:1 to 20:1 and a cerium dioxide content, whereby the weight amounts of noble metal, cerium dioxide and aluminum oxide constitute 100%, obtained by impregnating the optionally lattice-stabilized carrier material with an aqueous solution of a salt of palladium and rhodium, drying and tempering at temperatures above 250° C., optionally in a gas current containing hydrogen.

The catalyst is characterized in that it contains 5–20, preferably 11–20% by wt. cerium dioxide when the aluminum oxide is present in bulk form and 25–50% by wt. cerium dioxide when the aluminum oxide is present as a coating on a honeycombed, inert carrier of ceramics or metal, in which instance the aluminum oxide is impregnated with an aqueous solution of cerium salt before the impregnation with the solution of palladium salt and rhodium salt or, if the aluminum oxide is present on a honeycombed, inert carrier, it is also mixed in the aluminum oxide as cerium compound in solid form and that the catalytic precursor obtained is then tempered in air at 300°–950° C., preferably 600°–700° C.

The present invention differentiates the amounts of cerium dioxide for the first time as a function of the embodiment of the aluminum oxide as coating (wash coat) on an inert, monolithic or honeycombed carrier or as formed bulk material (balls, extruded blanks, tablets or the like). It was found that both species should be doped differently because of different diffusion conditions in bulk bodies and in wash coats.

All crystal modifications of $Al_2O_3$, individually or in a mixture, with the exception of $\alpha$-$Al_2O_3$, are potential aluminum oxide of the transition series. The specific surface according to BBT can be between 40 and 250 $m^2/g$.

The bulk weight of formed bulk material of the provided, active catalyst-furthering aluminum oxide is on the average 500 $kg/m^3$. The cerium dioxide added in by means of impregnation with aqueous cerium salt solutions, drying and calcining, permeates the molded aluminum oxide blank in an essentially uniform manner.

In order to achieve the same oxygen storage capacity per volumetric unit of the catalyst by means of cerium dioxide as in the case of aluminum oxide-coated monoliths or honeycombs in which the $Al_2O_3$ content is in the range of 100 $kg/m^3$, the cerium content must be set at a correspondingly lower concentration in relation to that of the monolithic catalyst.

It is surprising that in the triple combination of $Pd/Rh/CeO_2$, the function of the noble metal component when using customary amounts of rhodium can be brought to the same level as in the case of customary formulations containing platinum, rhodium and cerium dioxide in so far as the increased amounts of cerium dioxide are used in accordance with the invention. The customary initial materials in the form of water-soluble salts are used for the noble metal components.

An amount of aluminum oxide up to 20% by wt. can be replaced by zirconium dioxide, lanthanum oxide $La_2O_3$, neodymium oxide $Nd_2O_3$, praseodymium oxide $Pr_6O_{11}$ or nickel oxide NiO either as individual substance or as a mixture in the catalysts of the invention for the purpose of increasing the activity, for high temperature resistance, for the socalled lean stability in the case of exhaust gas compositions of $\lambda > 1$ and for endurance strength during operation.

Furthermore, the usage or co-usage of nickel oxide results in an increase of the hydrocarbon conversion and nitrogen oxide conversion in the rich exhaust range and a considerable diminution of the undesirable emission of hydrogen sulfide which occurs in rich operation, that is, at $\lambda < 1$.

Cerium(III)acetate in particular, in addition to cerium nitrate, ammonium cerium nitrate, cerium oxalate, cerium chloride, cerium carbonate, cerium oxide or cerium hydroxide and other cerium compounds is especially suitable for introducing the important modification component cerium dioxide $CeO_2$ in the necessary high concentrations. It can be added in the form of aqueous impregnation solutions to the production of bulk catalysts and of monolithic or honeycombed catalysts.

It is also possible in the production of the latter species of mixing in all of the cited compounds in the form of solids to the aluminum oxide.

A proven measure, especially for stabilizing the specific surface of the active aluminum oxide during continuous operation of the catalysts, consists in prestabilizing the lattice of the aluminum oxide by means of alkaline earth metal oxide, silicon dioxide, zirconium dioxide or by oxides of the rare earths. A variant of the invention makes advantageous use thereof.

Furthermore, a measure for separating the two noble metals from one another has proven to be beneficial within the scope of the invention for the retention of the specific individual actions of each metal.

Therefore, it has been found advantageous during the depositing of the aluminum oxide as coating on an inert honeycombed carrier, to apply the aluminum oxide, containing cerium oxide and optionally the other components, by means of an aqueous suspension in two layers onto the inert carrier. The first layer is impregnated with aqueous palladium salt solution, dried and optionally tempered as an intermediate step and the second layer is impregnated with aqueous rhodium salt solution and dried. The catalytic precursor obtained is then tempered, optionally in a current of gas containing hydrogen.

An additional advantage of the Pd/Rh three-way catalysts with high cerium oxide content of the invention resides in that they exhibit a lesser emission of hydrogen sulfide during rich operation in comparison to traditional Pt/Rh catalysts.

There is further constituted the use of the catalyst for the simultaneous conversion of carbon monoxide, hydrocarbons and nitrogen oxide from the exhaust gases of internal combustion engines.

The invention is described in more detail in the following examples of embodiments.

EXAMPLE 1

A honeycombed body of cordierite with 62 cells/cm$^2$, 102 mm in diameter and 152 mm long was coated by immersion in a 35% aqueous suspension which contained $\gamma$-Al$_2$O$_3$ (120 m$^2$/g), cerium(III)acetate and zirconyl acetate and in which these substances, calculated as oxides, were present in a ratio of Al$_2$O$_3$ : CeO$_2$ : ZrO$_2$ = 58:39:3. Excess suspension was removed by being blown out and the coated monolith was tempered after drying at 120° C. for 2 hours at 600° C., whereby CeO$_2$ and ZrO$_2$ were produced from the acetates. The applied coating was composed of 126.5 g Al$_2$O$_3$, 85 g CeO$_2$ and 6.5 g ZrO$_2$. The honeycombed body coated in this manner was subsequently covered by impregnation with an aqueous solution containing 0.88 g Pd in the form of Pd(NO$_3$) and 0.53 g Rh in the form of RhCl$_3$.

After the drying of the monolith impregnated with noble metal, a 4 hour reduction took place in forming gas (N$_2$:H$_2$=95:5) at 550° C.

EXAMPLE 2

A catalyst according to Example 1 was produced except that 1.18 g Pd and 0.23 g Rh were applied.

EXAMPLE 3 (reference example)

A honeycombed body was provided with an oxide layer as described in Example 1. Then, 1.18 g Pt in the form of H$_2$PTCl$_6$ and 0.23 g Rh in the form of RhCl$_3$ were applied by impregnation instead of Pd and Rh in the same manner as set forth in Example 1.

EXAMPLE 4

A honeycombed body was produced according to Example 2 except that no zirconyl acetate was contained in the suspension.

EXAMPLE 5

A ceramic honeycombed body according to Example 2 was coated with a 40% aqueous suspension containing CeO$_2$ and $\gamma$-Al$_2$O$_3$ (120 m$^2$/g) in a ratio of 39:61. After tempering, 134.5 g Al$_2$O$_3$ and 85 g CeO$_2$ were applied. The remaining production parameters corresponded to Example 2.

EXAMPLE 6

Cylindrical test specimens 38 mm in diameter were bored out of the catalysts produced according to Examples 1-5 parallel to the cells, built into a multi-chamber test reactor and reviewed as to their function as three-way catalyst in the exhaust current of an internal combustion engine.

The test engine was a 4-cylinder injection engine with a cubic capacity of 1781 cm$^3$ provided with a K-JETRONIC (continuous-injection system) of the Bosch firm.

In order to evaluate the low temperature activity of the catalysts, that temperature was determined at which 50% of the carbon monoxide, of the hydrocarbons ($\lambda$=1.02) and of the nitrogen oxides ($\lambda$=0.985) contained in the exhaust current were converted.

In addition, the catalytic activity was measured at 450° C. in a dynamic test at a wobble frequency of 1 Hz and a measure of deviation of 0.034.

The space velocity thereby was 64000 h$^{-1}$. For the various catalysts, the composition of the exhaust was as follows:

CO: 2.4 - 1.4% by vol.
HC: 450 - 350 ppm
NO$_X$: 2500 - 2000 ppm
O$_2$: 1.0% by vol.
CO$_2$: 13 - 14% by vol.

In order to determine the endurance behavior, the catalysts were operated over 200 hours on the engine at exhaust temperatures between 450° and 850° C.

The results of these tests with the catalysts of the invention together with those of the reference catalysts are contained in Table 1.

As the measured values show, the Pd/Rh catalysts of the invention according to Examples 1,2,4 and 5 are equally efficient as the Pt/Rh catalyst of reference Example 3 both in a fresh condition as well as after 200 hours of engine ageing.

The following Examples 7-9 show that the Pd/Rh three-way catalysts of the invention exhibit an even higher catalytic activity than commercially available Pt/Rh three-way catalysts described e.g. in German patent 29 07 106.

EXAMPLE 7

A ceramic monolith with 62 cells/cm$^2$, 102 mm in diameter and 152 mm long was covered by immersion with a suspension containing $\gamma$-Al$_2$O$_3$ (150m$^2$/g), cerium acetate and zirconyl nitrate in a ratio of the oxides of Al$_2$O$_3$:CeO$_2$: ZrO$_2$=65:28:7.

After the excess suspension had been blown out, the coated honeycombed body was dried at 120° C. and activated 1 hour at 900° C.

The coating amount was 135 g Al$_2$O$_3$, 58 g CeO$_2$ and 14.5 g ZrO$_2$. There were then applied 1.47 g Pd in the form of PdCl$_2$ and 0.29 g Rh in the form of RhCl$_3$ by impregnation from aqueous solution onto this monolith provided with carrier material. Following the drying of the impregnated form body at 150° C., a two-hour reduction took place at 500° C. in a hydrogen current.

EXAMPLE 8 (reference example)

The reference catalyst corresponded in dimensions and production conditions to the catalyst specimen of Example 7. However, the composition of the carrier material differed in that 139 g Al$_2$O$_3$, 10 g CeO$_2$, 12 g ZrO$_2$ and 6 g Fe$_2$O$_3$, were applied from an aqueous suspension of $\gamma$-Al$_2$O$_3$ (150 m$^2$/g), cerium acetate, zirconyl acetate and iron oxide Fe$_2$O$_3$ and that instead of Pd, the same amount of Pt was impregnated on in the form of H$_2$PtCl$_6$.

EXAMPLE 9

The catalysts produced according to Examples 7 and 8 were tested one after the other in the exhaust current of an internal combustion engine for their effectiveness as threeway catalyst. The test conditions corresponded to those described in Example 6 with the exception that in order to determine the dynamic conversion, a λ measure of deviation of 0.068 and a space velocity of 73000 $h^{-1}$ were taken as the basis.

The following exhaust composition was present:
CO: 3.3 - 2.2% by vol.
HC: 510 - 420 ppm
$NO_X$: 1500 - 2100 ppm
$O_2$: 1.65 - % by vol.
$CO_2$: 12 - 13% by vol.

The pollutant conversions of the catalysts were measured in the fresh state, after 24 hours tempering in air at 950° C. and after a further 100 hours of engine ageing. See Table 2.

In the fresh state, the Pd/Rh catalyst of the invention exhibits comparably high conversion rates in the dynamic test in comparison to the Pt/Rh reference catalyst; but, it exhibits higher temperatures in the 50% conversion and thus is a slight drawback.

The results in the aged state, however, are more important for evaluating a catalyst. To this end, a 24 hour thermal treatment at 950° C. was carried out at first in air, which permits a testing of the catalyst stability at intermittently lean operation of the engine (λ>1), as is customary in modern three-way concepts.

The Pd/Rh catalyst of the invention, provided with a high cerium oxide content, exhibits a considerably higher conversion in the dynamic test as well as a starting behavior which is approximately 100° C. better than that of the reference example. The 50% conversions of HC and $NO_X$ with values > 450° C. lie outside of the range of customary measurements and were therefore no longer detected.

After an additional 100 hours of engine ageing, the dynamic test again showed a much higher conversion for the Pd/Rh catalyst of the invention. In the case of the 50% conversion, the latter is likewise distinctly superior to the reference catalyst. This is particularly documented in the case of the $NO_X$ values.

In summary, it should be noted in accordance with these detailed technical application tests that the catalyst with the high cerium content and with the economical noble metal combination Pd and Rh is distinctly superior to the standard catalyst with Pt and Rh in most points of activity and is therefore preferable.

EXAMPLE 10

A cylindrical honeycombed body of cordierite 102 mm in diameter, 76 mm long and with a cell density of 62 cells/cm² is coated by immersion in a 30% aqueous suspension containing an aluminum oxide (80 m²/g) stabilized with calcium and containing cerium acetate.

The excess suspension is removed by being blown out with compressed air and the coated monolith dried at 120° C. This coating process is repeated, if necessary, in order to apply the desired amount of coating. The coated monolith is subsequently tempered 45 minutes at 600° C., during which time cerium acetate decomposes to $CeO_2$. The amount and the type of the oxides applied is indicated in Table 3.

The monolith coated in this manner is impregnated with an aqueous solution of $PdCl_2$ and $Rh(NO_3)_3$ containing Pd and Rh in a ratio of 5:1. The amount of noble metal applied is 1.1 g per catalyst.

The drying of the monolith impregnated with noble metal at 150° C. is followed by a two-hour reduction in forming gas ($N_2:H_2=95:5$) at 550° C.

EXAMPLE 11

A catalyst was produced according to Example 10 with the sole difference that the ratio of Pd : Rh was 2.5:1.

EXAMPLE 12

A catalyst was produced according to Example 10 with the sole difference that the ratio of Pd:Rh=15:1 was selected.

EXAMPLES 13–16

The catalysts of Examples 13–16 differ from those of Example 10 only in the amount of $CeO_2$ and $Al_2O_3$ applied.

EXAMPLE 17

Catalyst produced according to Example 10, with the difference that instead of cerium acetate, solid $CeO_2$ (obtained by thermal decomposition of cerium carbonate in air at 500° C.) was used.

EXAMPLE 18

Catalyst produced according to Example 10. The coating suspension contains aluminum oxide with a specific surface of 140 m²/g and lanthanum acetate.

EXAMPLE 19

Catalyst produced according to Example 10. The coating suspension contains $Al_2O_3$ with a specific surface of 140 m²/g and nickel oxide.

EXAMPLE 20

Catalyst produced according to Example 10 with a $SiO_2$-stabilized aluminum oxide (120 m²/g).

EXAMPLE 21

Catalyst produced according to Example 10 with an aluminum oxide (110 m²/g) stabilized with a mixture of rare earth oxides (La:Nd:Pr:Ce=61:21:8:10).

EXAMPLES 22 and 23

Catalyst produced according to Example 10 with the sole difference that the tempering of the catalytic precursor took place at 900° C. for one-half hour and 300° C. for four hours.

EXAMPLE 24 (Reference example)

Catalyst produced according to Example 10 with the difference that the coating contained little $CeO_2$ (added as acetate), $Al_2O_3$ with a specific surface of 140m²/g and, in addition, $Fe_2O_3$ (added as nitrate).

EXAMPLE 25 (Reference example)

Catalyst produced according to Example 10 with the difference that, as in conventional three-way catalysts, Pt (from $H_2PtCl_6$) and Rh (from $RhCl_3$) were added as active phase.

EXAMPLE 26

Catalyst produced according to Example 10 with the sole difference that the catalyst was not reduced.

EXAMPLE 27

A catalyst with a layered structure and dimensions, coating and noble metal content as described in Example 10 is produced as follows:

Two-thirds of the entire coating amount is applied in a first production cycle. The coated monolith is dried, tempered 45 min. at 600° C. in air and subsequently coated with a $PdCl_2$ solution, dried and tempered at 500° C. in air.

In the second production cycle, the Pd-containing monolith is provided with the remaining third of coating, dried and tempered 45 min. at 600° C. It is subsequently impregnated with $Rh(NO_3)_3$ solution, dried and reduced in forming gas (5% hydrogen in nitrogen) 2 hours at 550° C.

EXAMPLE 28

A catalyst with layered structure is produced in accordance with Example 27 with the coating suspension of Example 18.

EXAMPLE 29

70g $CeO_2$, 7 g $La_2O_3$ and 3 g $Nd_2O_3$ are applied by impregnation onto 1 $dm^3$ of a ball-shaped carrier of $\gamma$-$Al_2O_3$ (particle diameter 2–4 mm, tamped density 540 g/$dm^3$, specific surface 105 $m^2$/g, pore volume 0.85 $cm^3$/g). The impregnation takes place in two steps by pouring on an aqueous solution of cerium acetate, lanthanum acetate and neodymium acetate in each instance. A drying at 120° C. and a one-hour tempering at 550° C. take place after each impregnation step.

Subsequently, 0.8 g noble metal in the form of an aqueous solution of $PdCl_2$ and $Rh(NO_3)_3$ is applied. The Pd and Rh are present thereby in a weight ratio of 2:1. After drying at 120° C. and a tempering in air at 450° C., the catalyst is reduced 1 hour at 550° C. with forming gas ($N_2$:$H_2$=95: 5).

EXAMPLE 30

80 g $CeO_2$ are applied by means of two impregnations with cerium acetate onto 1 $dm^3$ of a ball-shaped carrier of $\gamma$-$Al_2O_3$ (particle diameter 2–4 mm, tamped density 440 g/$dm^3$, specific surface 108 $m^2$/g, pore volume 1.08 $cm^3$/g, prestabilized with 2% $ZrO_2$). The drying conditions and tempering conditions corresponded to Example 29.

$Pd(NO_3)_2$ and $Rh(NO_3)_3$ were used for the following noble metal impregnation. The concentration of noble metal was 0.6 g/$dm^3$ catalyst, the weight ratio Pd:Rh=7:1. After a drying at 120° C., the catalyst was reduced at 650° C. with forming gas ($N_2$:$H_2$=95:5).

EXAMPLE 31

The catalysts of Examples 10–30 were subjected to a 24-hour thermal ageing at 950° C. in air and subsequently subjected with a synthetic exhaust mixture to a technical application test. To this end, cylindrical test specimens with a diameter of 25 mm and a length of 75 mm were bored out of the monolithic catalysts and measured in a test reactor at a space velocity of 50,000 h$^{-1}$. Volumetrically equal amounts of the bulk catalysts were tested.

Test gas composition $CO_2$: 14% by vol.
$O_2$: 0.75 ± 0.75% by vol.
CO: 1% by vol. ± 1% by vol.
$H_2$: 0.33% by vol.
$C_3H_6$/$C_3H_8$ (2/1): 0.05% by vol.
NO: 0.1% by vol.
$H_2O$: 10% by vol.
$N_2$: remainder The dynamic test took place with a frequency of 1 Hz at 400° C. The starting behavior was measured at $\lambda=0.995$ for NO and at $\lambda=1.01$ for CO and hydrocarbons with a heating rate in each instance of 30° K./min.

The results of the testing of the catalytic activity are collated in Table 4.

TABLE 1

Starting Temperature and Pollutant Conversions in Wobble Test of the Catalysts

| Catalyst of Example | 50% Conversion at T° C. | | | | | | Conversion in % at $\lambda$ = 0.995 | | | | | |
|---|---|---|---|---|---|---|---|---|---|---|---|---|
| | Fresh state | | | 200 h Engine | | | Fresh state | | | 200 h Engine | | |
| | CO[1] | HC[1] | $NO_x$[2] | CO[1] | HC[1] | $NO_x$[2] | CO | HC | $NO_x$ | CO | HC | $NO_x$ |
| 1 | 295 | 297 | 287 | 300 | 306 | 294 | 99 | 93 | 99 | 99 | 93 | 97 |
| 2 | 304 | 304 | 309 | 305 | 307 | 310 | 99 | 93 | 99 | 97 | 93 | 95 |
| 3* | 300 | 297 | 305 | 302 | 303 | 312 | 98 | 93 | 99 | 98 | 94 | 94 |
| 4 | 306 | 308 | 317 | 306 | 310 | 320 | 98 | 93 | 99 | 97 | 92 | 94 |
| 5 | 309 | 310 | 315 | 307 | 312 | 317 | 98 | 93 | 99 | 96 | 94 | 93 |

[1] $\lambda$ = 1,02
[2] $\lambda$ = 0,984
*Reference example

TABLE 2

Comparison of Catalytic Activity

| | | Catalyst Example 7 | Catalyst Example 8 (Reference) |
|---|---|---|---|
| Fresh | | | |
| T° C. | 50% CO | 303° C. | 279° C. |
| | 50% HC | 306° C. | 285° C. |
| | 50% NO | 323° C. | 290° C. |
| Conversion | | | |
| | CO | 97% | 96% |
| $\lambda$ = 0.995 | HC | 95% | 98% |
| | $NO_x$ | 96% | 94% |
| Ageing 24 h Air | | | |
| T° C. | 50% CO | 347° C. | 448° C. |
| | 50% HC | 354° C. | n. e. |
| | 50% $NO_x$ | 379° C. | n. e. |
| Conversion | | | |
| | CO | 89% | 43% |
| $\lambda$ = 0.995 | HC | 93% | 32% |
| | $NO_x$ | 65% | 13% |
| 100 h Engine Ageing | | | |
| T° C. | 50% CO | 341° C. | 356° C. |
| | 50% HC | 351° C. | 357° C. |
| | 50% $NO_x$ | 378° C. | 448° C. |
| Conversion | | | |
| | CO | 75% | 58% |
| $\lambda$ = 0.995 | HC | 86% | 70% |

TABLE 2-continued

| Comparison of Catalytic Activity | | |
|---|---|---|
| | Catalyst Example 7 | Catalyst Example 8 (Reference) |
| $NO_x$ | 53% | 42% | n. e. (not detected) - 50% Conversion greater than 450° C.

TABLE 3

Composition of the Catalysts

| Example | Coating Composition in Grams per Monolith | | | Ratio of Noble Metal in the active phase |
|---|---|---|---|---|
| | $Al_2O_3$ | $CeO_2$ | Other Additives | |
| 10 | 64 | 36 | 2 CaO | Pd:Rh = 5:1 |
| 11 | 63 | 36 | 2 CaO | Pd:RH = 2,5:1 |
| 12 | 64 | 36 | 2 CaO | Pd:RH = 15:1 |
| 13 | 66 | 10 | 2 CaO | Pd:RH = 5:1 |
| 14 | 64 | 23 | 2 CaO | Pd:RH = 5:1 |
| 15 | 54 | 48 | 1,8 CaO | Pd:RH = 5:1 |
| 16 | 32 | 64 | 1 CaO | Pd:RH = 5:1 |
| 17 | 65 | 35 | 2 CaO | Pd:RH = 5:1 |
| 18 | 64 | 36 | 8 $La_2O_3$ | Pd:RH = 5:1 |
| 19 | 64 | 36 | 2 NiO | Pd:RH = 5:1 |
| 20 | 65 | 35 | 2,3 $SiO_2$ | Pd:RH = 5:1 |
| 21 | 66 | 36 | 4 SE-Oxide* | Pd:RH = 5:1 |
| 22 | 65 | 36 | 2 CaO | Pd:RH = 5:1 |
| 23 | 64 | 36 | 2 CaO | Pd:RH = 5:1 |
| 24 | 68 | 8 | 3 $Fe_2O_3$ | Pd:RH = 5:1 |
| 25 | 65 | 36 | 2 CaO | Pd:RH = 5:1 |
| 26 | 65 | 36 | 2 CaO | Pd:RH = 5:1 |
| 27 | 64 | 36 | 2 CaO | Pd:RH = 5:1 |
| 28 | 64 | 36 | 8 $La_2O_3$ | Pd:RH = 5:1 |

*SE-oxide = rare earths oxides

TABLE 4

Starting Behavior and Pollutant Conversions in Dynamic Test for the Catalysts of Examples 10-30

| Example | Starting Temperatures 50% Conversion at T° C. | | | Conversion in % at 0.995 | | |
|---|---|---|---|---|---|---|
| | CO* | HC* | $NO_x$** | CO | HC | $NO_x$ |
| 10 | 251 | 271 | 260 | 91 | 93 | 99 |
| 11 | 235 | 256 | 240 | 92 | 94 | 100 |
| 12 | 282 | 303 | 295 | 99 | 91 | 96 |
| 13 | 279 | 291 | 275 | 80 | 90 | 81 |
| 14 | 271 | 282 | 270 | 85 | 90 | 86 |
| 15 | 268 | 280 | 273 | 84 | 89 | 85 |
| 16 | 301 | 323 | 309 | 78 | 80 | 80 |
| 17 | 255 | 275 | 268 | 87 | 94 | 84 |
| 18 | 248 | 265 | 257 | 91 | 93 | 99 |
| 19 | 250 | 270 | 257 | 92 | 94 | 99 |
| 20 | 253 | 274 | 263 | 91 | 93 | 99 |
| 21 | 251 | 274 | 262 | 90 | 93 | 99 |
| 22 | 252 | 273 | 258 | 90 | 93 | 99 |
| 23 | 250 | 270 | 262 | 90 | 92 | 99 |
| 24 | 285 | 308 | 301 | 84 | 87 | 89 |
| 25 | 312 | 347 | 323 | 90 | 78 | 95 |
| 26 | 253 | 275 | 264 | 90 | 92 | 98 |
| 27 | 248 | 265 | 255 | 92 | 94 | 99 |
| 28 | 247 | 267 | 258 | 92 | 94 | 99 |
| 29 | 273 | 285 | 281 | 91 | 93 | 99 |
| 30 | 275 | 288 | 284 | 90 | 92 | 98 |

*CO and Hydrocarbons at λ = 1.01
**NO at λ = 0.995

We claim:

1. A platinum-free three-way supported catalyst with an active phase applied to aluminum oxide of the transition series,
   said active phase consisting of 0.03-3% by weight palladium and rhodium with a weight ratio between palladium and rhodium of 1:1 to 20:1,
   said aluminum oxide having a cerium dioxide content of 25 to 50% by weight, whereby the weight amounts of noble metal, cerium dioxide and aluminum oxide constitute 100%, the active phase being present as a coating on a honeycombed, inert carrier support of ceramic or metal,
   the supported catalyst being obtained by a process comprising: depositing onto said honeycombed, inert carrier support the aluminum oxide, optionally latticestabilized, in the form of an aqueous suspension in which a cerium salt is dissolved in solution and which optionally additionally contains a cerium compound in solid form to thereby obtain a catalyst precursor A,
   drying and tempering said catalyst precursor A deposited on said carrier support in air at 300°-950° C.,
   thereafter impregnating said catalyst precursor A with an aqueous solution of palladium- and rhodium salt to thereby obtain a catalyst precursor B,
   drying and finally tempering said catalyst precursor B at a temperature above 250° C., optionally in a gas stream containing hydrogen.

2. The catalyst according to claim 1, characterized in that up to 20% by weight of the amount of aluminum oxide is replaced by zirconium dioxide, lanthanum oxide, neodymium oxide, praseodymium oxide or nickel oxide, or mixtures thereof.

3. The catalyst according to claim 1, characterized in that cerium(III)-acetate is used as a precursor for cerium dioxide.

4. The catalyst according to claim 2, characterized in that cerium(III)-acetate is used as a precursor for cerium dioxide.

5. The catalyst according to claim 1, characterized in that the lattice of the aluminum oxide is stabilized by alkaline earth metal oxide, silicon dioxide, zirconium dioxide or by oxides of the rare earths.

6. The catalyst according to claim 2, characterized in that the lattice of the aluminum oxide is stabilized by alkaline earth metal oxide, silicon dioxide, zirconium dioxide or by oxides of the rare earths.

7. The catalyst according to claim 3, characterized in that the lattice of the aluminum oxide is stabilized by alkaline earth metal oxide, silicon dioxide, zirconium dioxide or by oxides of the rare earths.

8. A platinum-free three-way supported catalyst with an active phase applied to aluminum oxide of the transition series,
   said active phase consisting of 0.03-3% by weight palladium and rhodium with a weight ratio between palladium and rhodium of 1:1 to 20:1,
   said aluminum oxide having a cerium dioxide content of 25 to 50% by weight, whereby the weight amounts of noble metal, cerium dioxide and aluminum oxide constitute 100%, the active phase being present as a coating on a honeycombed, inert carrier support of ceramic or metal,
   the supported catalyst being obtained by a process comprising: impregnating the aluminum oxide, optionally lattice-stabilized, with an aqueous solution of cerium salt and/or by mixing a cerium compound in solid form into the aluminum oxide to thereby obtain a catalyst precursor A,
   tempering said catalyst precursor A deposited on said carrier support in air at 300°-950° C.,
   depositing a first portion of said catalyst precursor A as an aqueous suspension in a first deposition step onto said inert carrier support thereby forming a first layer, impregnating said first layer with aqueous palladium salt solution, drying and optionally tempering said first layer, depositing a second portion of said catalyst precursor A as an aqueous suspension in a second deposition step onto said inert carrier thereby forming a second layer, impregnating said second layer with aqueous rhodium salt solution, to thereby form a catalyst precursor B, drying and finally tempering said catalyst precursor B at a temperature above 250° C., said tempering being optionally carried out in a gas stream containing hydrogen.

9. The catalyst according to claim 8, characterized in that up to 20% by weight of the amount of aluminum oxide is replaced by zirconium dioxide, lanthanum oxide, neodymium oxide, praseodymium oxide or nickel oxide taken alone or in combination.

10. The catalyst according to claim 8, characterized in that cerium(III)-acetate is used as a precursor for cerium dioxide.

11. The catalyst according to claim 9, characterized in that cerium(III)-acetate is used as a precursor for cerium dioxide.

12. The catalyst according to claim 8, characterized in that the lattice of the aluminum oxide is stabilized by alkaline earth metal oxide, silicon dioxide, zirconium dioxide or by oxides of the rare earths.

13. The catalyst according to claim 9, characterized in that the lattice of the aluminum oxide is stabilized by alkaline earth metal oxide, silicon dioxide, zirconium dioxide or by oxides of the rare earths.

14. The catalyst according to claim 10, characterized in that the lattice of the aluminum oxide is stabilized by alkaline earth metal oxide, silicon dioxide, zirconium dioxide or by oxides of the rare earths.

* * * * *